United States Patent Office 3,408,434
Patented Oct. 29, 1968

3,408,434
PROCESS FOR THE PRODUCTION OF FOILS OF HIGH E-MODULUS
Wilhelm Thoma, Cologne-Flittard, and Heinrich Rinke and Hieronymus Zygan, Leverkusen, Germany, assignors to Farbenfabriken Bayer Aktiengesellschaft, Leverkusen, Germany, a corporation of Germany
No Drawing. Filed June 9, 1965, Ser. No. 462,735
Claims priority, application Germany, June 26, 1964, F 43,275
13 Claims. (Cl. 264—210)

ABSTRACT OF THE DISCLOSURE

A method which comprises reacting an organic polyisocyanate with a linear polyester having a molecular weight in the range of from about 800 to about 6,000 and melting above about 180° C. in the presence of an inert organic solvent having a boiling point of at least about 150° C., removing the solvent, extruding the solvent-free reaction product, biaxially stretching the extruded product to form a foil and thereafter fixing the stretched foil with heat while in the stretched condition.

---

This invention relates to the production of foils and more particularly to foils having a high E-modulus by the isocyanate polyaddition process.

It is known that foils of thermoplastic, high molecular weight products can be produced by rapidly cooling the extruded melts of these products, longitudinally and transversely stretching the foils thus obtained at elevated temperatures and then heat fixing at elevated temperatures while substantially maintaining the dimensions.

It is further known that linear polyester containing hydroxyl groups can be reacted with diisocyanates or with masked diisocyanate compounds which release the reactive NCO group only at elevated temperatures.

It is also known that high melting polyesters, especially those of terephthalic acid and butane-1,4-diol, when reacted with diisocyanates and aryl esters of biscarbamidic acid, give polyester urethanes and/or -amides, that can be extruded to form foils which can be stretched and fixed by heat at elevated temperatures and have a crystalline structure that is clearly identifiable radiographically.

Such foils have an E-moduli of only 200 to 250 kg./mm.² However, foils used for the production of photographic film foundations or for the production of recording tapes should have a high E-moduli with low stretching, high tensile strength and good impact elasticity. The E-moduli should be at least 350 kg./mm.²

Furthermore, the reaction between free diisocyanates and high melting polyesters, such as, polyesters of terephthalic acid and butane-1,4-diol, having a melting point of between 220 to 225° C., is very difficult in practice. Due to the high reaction temperatures employed, resulting from the melting point of the polyester, the reaction for example with hexamethylene diisocyanate or toluylene diisocyanate does not proceed in a uniform manner. Because of branching and cross-linking there is produced a heterogeneous melt, which makes it impossible to produce optically clear foils. Even with the solvents, e.g. phenetole, m-cresyl-ethyl ether, N-methyl-pyrrolidone or phenol, the reaction of high melting polyesters with diisocyanates, according to the process described by German patent specification 922,255, does not improve the type of foils produced.

This is due in part to the fact that, although phenetole dissolves the high melting polyesters in question at temperatures close to the boiling point, it does not dissolve the polyester urethanes resulting from the reaction with diisocyanates. N-methyl-pyrrolidone, on the other hand, is similar to dimethyl-formamide in that it is not inert to NCO groups, especially at elevated temperatures, e.g. above 100° C. Phenol has a disintegrating effect on the high melting polyesters or polyester urethanes in question at temperatures above 120° C. so that in practice polycondensation of the polyesters with diisocyanates to form high molecular products having the character of synthetic resins cannot be carried out in this solvent.

Therefore, it is an object of this invention to provide foils having a high E-modulus. Another object of this invention is to provde foils having a high E-modulus from the reaction products of an isocyanate polyaddition process. Still another object of this invention is to provide foils from high melting linear aromatic polyesters and polyisocyanates. A further object of this invention is to provide foils having a high E-modulus by extruding the polyaddition product of high melting linear aromatic polyesters and polyisocyanates.

The foregoing objects and others will become apparent from the following description and are accomplished in accordance with the invention, generally speaking, by reacting a polyisocyanate with linear polyesters which have molecular weights in the range of from about 800 to about 6,000 and melt above 180° C. in the presence of an inert organic solvent boiling between about 150° C. and about 300° C., extruding the solvent free reaction product, biaxially stretching the extruded product to form a foil and thereafter fixing the stretched foil with heat while in a stretched condition.

In other words, the process is characterized by the use of reaction products which have been obtained by reacting diisocyanates with linear polyesters which melt above 180° C. and have molecular weights of 800 to 6,000 and are formed from aromatic dicarboxylic acids, with if desired, the inclusion of up to 30 mol percent of non-aromatic dicarboxylic acids, and ethylene glycol, if desired with the inclusion of up to 30 mol percent of other dihydric alcohols, the reaction being carried out in solvents boiling between 150 and 330° C. especially halogenated and/or nitrated aromatic hydrocarbons, in the homogeneous phase and using approximately equivalent quantities. Before the forming process, these reaction products are freed from solvents, for example by distillation or steam distillation, and optionally dried. The forming process itself is carried out by extruding the reaction products on cooled rollers, followed by longitudinal and transverse stretching and heat fixation. Stretching is carried out at temperatures of from about 30° C. to about 80° C., preferably from about 45° C. to 55° C. and heat fixation is carried out at a temperature of from about 60° C. to 210° C. Longitudinal and transverse stretching are preferably carried out simultaneously. The foils are stretched in both directions in the ratio of 1:1.5 to 1:6, preferably 1:3 to 1:5.

The polyesters of molecular weight 800 to 6,000, preferably 2,000 to 4,000, which are used as starting materials, are obtained by known methods, e.g. by esterification of dicarboxylic acids with dihydric alcohols, by ester interchange of alkyl or hydroxyalkyl esters of dicarboxylic acids with dihydric alcohols or from dicarboxylic acid chlorides and dihydric alcohols. The melting point of the polyesters should be above 180° C., generally from C. to 260° C. and preferably from 200° C. to 240° C.

It is especially advantageous for the ratio of dihydric alcohol to dicarboxylic acid in the esterification process to be such that the resulting polyester contains predominantly or exclusively carboxyl end groups. The polycondensation products obtained from the reaction with diisocyanates have greater thermostability than those prepared from polyesters which contain predominantly OH end groups.

However, polyesters containing predominantly OH end groups can be converted into polyesters containing predominantly or exclusively carboxyl end groups by reacting them with approximately equivalent quantities of a dicarboxylic acid anhydride.

Representative examples of suitable aromatic acids which may be used as such or in the form of their polyester-forming derivatives, are: terephthalic acid, isophthalic acid, diphenyl-4,4'-dicarboxylic acid, diphenyl sulfone-4,4'-dicarboxylic acid, diphenyl-ether-4,4'-dicarboxylic acid, benzophenone-4,4'-dicarboxylic acid, naphthalene 2,6- and 2,7-dicarboxylic acid and ethane diphenyl ether-4,4'-dicarboxylic acid. If desired, up to about 30 mol percent of other carboxylic acids, such as, aliphatic carboxylic acids may be used; for example, succinnic acid, adipic acid, sebacic acid, ether dipropionic acid, 1,4-cyclohexane dicarboxylic acid, 4-carboxyphenyl-propionic acid, 1,4-phenylene ether diacetic acid and 1,3-phenylene ether dipropionic acid. In addition to ethylene glycol, up to 30 mol percent of other glycols, such as, primary and secondary glycols may be used if desired. Suitable glycols are the polymethylene glycols, e.g. propane-1,3-diol, butane-1,4-diol, hexane-1,6-diol, hexane 2,5-diol, decane-1,10-diol, 2,2-dimethylpropane-1,3-diol, pentamethylene glycol, diglycol, dithiodiglycol, xylene-1,3-glycol or 1,4-glycol and 1,4-bis-hydroxymethyl cyclohexane. Aromatic diols which may be employed are dihydroxy aromatic hydrocarbons of 6 to 16 carbon atoms. These include the following diols: hydroquinone, resorcinol, p,p'-diphenylolmethane, p,p'-diphenylolpropane, p,p'-dihydroxybiphenyl, 4,4'-dihydroxybibenzyl, 2,6-dihydroxynaphthalene and 1,4-dihydroxynaphthalene. Polyesters formed from the reaction of glycerine or other polyhydroxy alcohols with aromatic dicarboxylic acids may also be used.

The following dicarboxylic acid anhydrides may, for example, be used to convert polyesters that contain mainly hydroxyl end groups into polyesters containing mainly carboxyl end groups: maleic anhydride, succinic anhydride, glutaric anhydride and phthalic anhydride, tetrahydro-phthalic anhydride and hexahydro-phthalic anhydride.

Any of a wide variety of organic polyisocyanates may be employed in the reaction with the high melting polyesters including aliphatic, aromatic and cycloaliphatic diisocyanates and combinations of these types. Representative compounds include hexamethylene diisocyanate, tetramethylene diisocyanate, 1,4-cyclohexane diisocyanate, 1,4- and 1,3-phenylene diisocyanate, 2,4- and 2,6-toluylene diisocyanate, 4,4'-diphenylmethane diisocyanate, 1-methoxy-2,4-phenylene diisocyanate, 1-methyl-3,5-diethyl-2,6-phenylene diisocyanate, 1,3,5-triethyl-2,4-phenylene diisocyanate, 1-methyl-3,5-diethyl-2,4-phenylene diisocyanate, 1-methyl-3,5-diethyl-6-chloro-2,4-phenylene diisocyanate, 6-methyl-2,4-diethyl-5-nitro-1,3-phenylene diisocyanate, p-xylylene diisocyanate, m-xylylene diisocyanate, 4,6-dimethyl-1,3-xylylene diisocyanate, 1,3-dimethyl-4,6-bis-(beta-isocyanatoethyl)benzene, 3-(alpha-isocyanatoethyl)-phenyl isocyanate, 1-methyl-2,4-cyclohexylene diisocyanate, 4,4'-biphenylene diisocyanate, 3,3'-dimethyl-4,4'-biphenylene diisocyanate, 3,3'-dimethoxy-4,4'-biphenylene diisocyanate, 3,3'-diethoxy-4,4'-biphenylene diisocyanate, 1,1'-bis-(4-isocyanatophenyl) cyclohexane, 4,4'-diisocyanatodiphenylether, 4,4'-diisocynato-3,3'-dimethyldiphenylmethane, 4,4'-diisocyanato-3,3'-dichlorodiphenylmethane, 4,4'-diisocyanate-diphenyl-dimethylmethane, 1,5-naphthylene diisocyanate, 1,4-naphthylene diisocyanate, o-tolidine-4,4'-diisocyanate, m-tolidine-4,4'-diisocyanate, and benzophenone-4,4'-diisocyanate.

For the reaction of the high melting polyester with diisocyanates in homogeneous phase, inert organic solvents which boil between 150° C. and 330° C. are used, especially halogenated and/or nitrated aromatic hydrocarbons, such as o-, m- or p-dichlorobenzene or commercial isomeric mixtures thereof, trichlorobenzenes, especially their commercial isomeric mixtures, bromobenzene, dibromobenzenes, o-, m- or p-chlorotoluene, dichlorotoluenes, chloroxylenes, nitrobenzene, mononitrotoluenes, monochloromononitrobenzenes, methyl, ethyl, isopropyl or benzyl benzoate, ethyl, ethyl p-toluate, acetophenone or propiophenone. It is also possible to use mixtures of these solvents.

Generally, it is preferred that the components be reacted together in solution in approximately mol equivalent amounts, however, slight deviations from the equivalent amounts is permissible where an excess in polyesters is employed. It is possible to use up to about a 10 percent excess of polyesters. The reaction temperature is not critical and may range from about 150° C. to 230° C., preferably from about 180° C. to 200° C. In reacting the polyisocyanate with the polyester, the polyisocyanate, if desired in solution, is added dropwise at a temperature from about 180° C. to 200° C. over a period of from 10 to 60 minutes to a solution of the high melting polyester. After all the polyisocyanate has been added, the reaction solution is maintained at the above-mentioned reaction temperature for an additional 10 to 120 minutes. The concentration of solids in the solution is adjusted to 20 to 50 percent by weight, preferably from 30 to 40 percent by weight. When the reaction is finished, the solvent is removed from the reaction solution by the conventional techniques, such as distillation, decantation, etc., the last portions of solvent being preferably removed in vacuo. The temperature in the reading vessel, e.g. an autoclave with stirrer and bottom valve, is raised to about 10° C. above the melting point of the poly-condensate to enhance solvent removal. The resulting melt can be removed from the reaction vessel by applying nitrogen under pressure (2 to 5 atmospheres above atmospheric pressure). By using suitable nozzles, the poly-condensate can immediately be formed into foils; however, it is also possible first to spin a wire, for example 2 mm. thick, and then granulate this wire and extrude the granulate into foils.

Another method of isolating the polycondensate from the reaction solution is for example, to run the solution into metal vats. When cold, the solution, which preferably has a concentration of 30–40 percent by weight, solidifies to a solid gel which can easily be ground in a suitable mill to granules of a grain size of less than 1 mm. The solvent contained in the gel granulate is driven off by steam distillation. The granulate is then dried in vacuo at 110° C.

The granulate is formed into a foil, for example, 0.8 to 1 mm. thick, by means of a conventional extruder, with a flat sheeting die. In accordance with the invention, the extruded foil is applied to rollers cooled to 40 to 80° C. preferably 45° C. to 55° C. and chilled to preserve the amorphous state. A conventional stretching machine is suitable for stretching the extruded product, such as for example, the machine described in U.S. patent specification No. 3,114,929. The extruded foil is heated to a temperature sufficient to cause the foil to be in a plastic condition, such as for example, from about 40° C. to about 80° C., preferably 50° C. to 70° C. and thereafter stretched simultaneously and equally in longitudinal and transverse directions. In other words, this is a two-dimensional stretching operation in which the ratio of stretching is from 1:1.5 to 1:6, preferably 1:3 to 1:5. Finally, the foil is fixed at 90° C. to 210° C., preferably 150° C. to 180 C., while maintaining its dimensions. Because of the two dimentional stretching, the E-moduli are practically equal in two directions at right angles to each other. They lie between 350 and 600 kg./mm.$^2$, generally from 400 to 550 kg./mm.$^2$ Due to the fact that these foils have such a high E-moduli, they are especially suitable as foundations for photographic films and for the production of recording tapes.

The invention will be further illustrated by the following examples in which parts are by weight unless otherwise specified. It should be noted however, that these examples are merely illustrative and do not limit the invention to the particulars disclosed therein.

EXAMPLE 1

Preparation of the Polyester

Approximately 3728 parts of dimethyl terephthalate and about 2600 parts of ethylene glycol are heated with about 0.4 part of lead oxide for 12 hours at a temperature between about 165° and 215° C. with stirring, in a nitrogen atmosphere. The methanol evolved from the reaction is continuously distilled off through a small column. When about 1200 parts of methanol has distilled off, 700 parts of adipic acid are added to the reaction mixture and the mixture is reacted for about 3 hours at a temperature of about 230° C. at a pressure of about 0.1 mm. Hg. The resulting copolyester melts at a temperature of between about 205° to 210° C. and has a molecular weight of 3300.

Preparation of the Polyester Urethane

About 2300 parts of the finely ground polyester (grain size 0.5 mm.) prepared above are dissolved in about 3950 parts of anhydrous trichlorobenzene in a 10 litre autoclave which is equipped with a stirrer, a bottom valve nitrogen valve, an internal thermometer, a dropping funnel and a cooler. Nitrogen is passed through the solution. A solution containing about 180 parts of hexane diisocyanate in about 550 parts of trichlorobenzene is added dropwise over a period of about 20 minutes to the hot solution which is maintained at a temperature of about 190° C. After the addition of diisocyanate is complete, the reaction solution is agitated for an additional 30 minutes at a temperature of about 190° C.

The solution is then expelled at a pressure of about two atmospheres above atmospheric pressure with nitrogen through the bottom valve, through a filter chamber heated to about 190° C. into a vat of VA-steel. After cooling, the resulting compact polyester urethane gel is ground in a mill to form a granulate from about 1 to 2 mm. grain size and the trichlorobenzene is then removed from the granulate by steam distillation. The granulate freed from solvent is dried in vacuo at about 110° C. or in a drying cupboard with circulating air at normal pressure. The melting point of the polyester urethane is from about 205° to about 210° C., and the K-value is about 58.8.

Production of the Foil

Before extrusion, the granulate is dried for about 3 hours at a temperature of about 110° C. at a pressure of about 0.1 mm. Hg and then extruded through a broad sheeting die of about 160 mm. width by means of a laboratory screw of about 26 mm. in diameter. The residence time of the polyester urethane in the screw is from about 3 to 5 minutes at a temperature of from about 235° to about 250° C. The foil is chilled by passing it over a roller, at a temperature of about 40 to 50° C. in a water bath. The amorphous foil is then stretched two-dimensionally in the ratio $(1:3.8)^2$ at a temperature of about 50° to about 60° C. and then fixed by heating for about 5 minutes at a temperature of about 180° C. under stretching tension. The glass clear foil thus formed has an E-modulus of 530 kg./mm.$^2$ in all directions.

By contrast, a foil formed from a polyester urethane which is prepared according to DBP 922,255 from a terephthalic acid/butane-1,4-diol polyester and hexane diisocyanate, has an E-modulus of only 230 kg./mm.$^2$.

EXAMPLE 2

Approximately 5,122 parts of dimethyl terephthalate, about 2,088 parts of ethylene glycol and about 523 parts of butanediol are polyesterified by the method described in Example 1 with about 3.0 parts of lead oxide and about 0.85 part of antimony oxide. The polyester obtained melts at a temperature between about 220° and about 230° C. and has a molecular weight of approximately 2,400.

About 3,032 parts of this polyester are dissolved in about 3,600 parts of trichlorobenzene at a temperature of about 190° C. in an autoclave equipped with a stirrer as described in Example 1. A solution of about 213 parts of hexane diisocyanate in about 215 parts of trichlorobenzene is added dropwise over a period of about 20 minutes. After the addition of the diisocyanate, the reaction solution is maintained for an additional 25 minutes at a temperature of about 190° C. The trichlorobenzene is distilled off with a gradual increase in the internal temperature of the reaction vessel and slow reduction of the pressure. Finally, at an internal temperature of about 230° C. the pressure is reduced to about 0.5 mm. Hg for about 30 minutes to distill off the remaining trichlorobenzene. The melt of the polyester urethane is then removed through the bottom valve under a nitrogen pressure of from about 4 to 5 atmospheres above atmospheric pressure and collected on sheets. The polyester urethane thus obtained is ground in a mill to granulate of about 2 mm. grain size. As an alteration procedure, the polyseter urethane can be spun off in the form of a wire by attaching a spinning pump and a nozzle to the outlet flange of the autoclave. The wire is chilled in a water vat of 3 mm. in length, wound and subsequently granulated and dried in vacuo at a temperature of about 110° C. The melting point of the polyester urethane thus formed is between 218° to 222° C. and the K-value is about 61.7.

A foil produced according to Example 1 from this polyester urethane has an E-modulus of about 470 kg./mm.$^2$ in all directions.

EXAMPLE 3

About 4,074 parts of dimethyl terephthalate, about 2,340 parts of ethylene glycol and about 495 parts of hexane-1,6-diol are polyesterified as described in Example 1 with about 2.1 parts of lead oxide and about 0.7 part of antimony oxide. The polyester melts at a temperature of between about 210° to 215° C. and has a molecular weight of about 2,750.

About 2,169 parts of this polyester are dissolved in about 2,900 parts of trichlorobenzene at a temperature of about 190° C. in an autoclave equipped with a stirrer as described in Example 1. A solution of about 133 parts of hexane diisocyanate in about 500 parts of trichlorobenzene is added dropwise over a period of about 20 minutes. After an additional 25 minutes, the reaction is complete. The solution is discharged through the bottom valve of the autoclave and worked up into a granulate as described in Example 1.

The foils thus produced have an E-modulus of 480 kg./mm.$^2$ in all directions after two-dimensional stretching and fixation by the method described in Example 1.

EXAMPLE 4

About 50 parts of a polyester obtained from terephthalic acid, adipic acid and ethylene glycol having a melting point between about 210° to 215° C. and a molecular weight of about 2500, prepared according to Example 1 are dissolved in about 70 parts of nitrobenzene at a temperature of between about 185° to 190° C. A solution of about 3.32 parts of trans-1,4-cyclohexane diisocyanate (M.P. 60°–61° C.) in about 20 parts of nitrobenzene are added dropwise over a period of about 20 minutes at a temperature of about 190° C. and the reaction solution is then maintained for an additional 26 minutes at this temperature. The solution which solidifies to a solid gel at room temperature, is granulated in a Star-Mix apparatus in the presence of water. The nitrobenzene is removed by steam distillation and the granulate is dried in vacuo at a temperature of about 110° C. It has a melting point of between 205° to 220° C. and a K-value of about 73.0.

The 70 parts of nitrobenzene used for dissolving the 50 parts of polyester may equally well be replaced by 70 parts of p-dibromobenzene.

The polyester may also be dissolved in about 110 parts of monobromobenzene. The reaction temperature is then maintained at a temperature of about 155° C. and the reaction time is about 45 minutes in duration.

Removal of the mono- and dibromobenzene is also carried out by steam distillation.

If 50 parts of a polyester of terephthalic acid, adipic acid and ethylene glycol having a molecular weight of about 2,500 are reacted in about 70 parts of trichlorobenzene at a temperature of about 190° C. with a solution of about 3.32 parts of cis-1,4-cyclohexane diisocyanate (liquid) in about 20 parts of trichlorobenzene and the reaction product is worked up as above, a polyester granulate having a melting point of between about 200° to 208° C. and a K-value of about 63.0 is obtained.

EXAMPLE 5

Approximately 50 parts of the polyester of terephthalic acid, adipic acid and ethylene glycol having a molecular weight of about 2,500 used in Example 4 are dissolved in about 65 parts of trichlorobenzene at a temperature of about 185° C. A solution of about 5 parts of 4,4-diphenylmethane diisocyanate in about 30 parts of trichlorobenzene are added dropwise to this polyester solution at a temperature between about 185° to 190° C. over a period of about 20 minutes and the reaction solution is then maintained at this temperature for an additional 15 minutes. The gel formed on cooling is worked into a granulate as described in Example 4. It has a melting point of between about 200° to 208° C. and a K-value of about 77.4.

If about 3.48 parts of toluylene-2,4-diisocyanate and toluylene-2,6-diisocyanate (isomeric mixture 60:40) are used instead of 5 parts of 4,4'-diphenylmethane diisocyanate, then a polyester urethane having a melting point between about 197° to 202° C. and a K-value of about 61.6 is obtained.

EXAMPLE 6

About 3.30 parts of maleic anhydride is reacted for about 60 minutes at a temperature of about 200° C. with about 85 parts of a trichlorobenzene solution containing about 50 parts of a polyester of terephthalic acid, adipic acid and ethylene glycol having a melting point of between about 210° to 215° C. and a molecular weight of about 3,000 which was prepared in accordance with the polyester described in Example 1. About 2.80 parts of hexane diisocyanate dissolved in about 30 parts of trichlorobenzene are added dropwise to the solution of the resulting polyester which now contains carboxyl end groups and the mixture is permitted to react for an additional 2 hours at a temperature of about 200° C. until the evolution of $CO_2$, which is at first vigorous, comes to a standstill. The reaction mixture, which solidifies to a solid gel on cooling, is granulated and freed from trichlorobenzene by steam distillation. The melting point of the polycondensate is between about 210° to 215° C. and the K-value is about 61.6.

If about 3.80 parts of glutaric anhydride are used instead of about 3.30 parts of maleic anhydride and the reaction is carried out in a similar manner, then a polycondensate having similar properties is obtained.

EXAMPLE 7

After the addition of about 0.150 part of zinc acetate and about 0.040 part antimony oxide, about 1,270 parts of bis-hydroxyethyl terephthalate are heated for about 5 hours at a temperature of about 230° C. at normal pressure and thereafter for an additional 4 hours at a temperature of about 260° C. at 12 mm. Hg. When about 240 parts of ethylene glycol, which split off during the formation of the polyester, have been distilled off, about 146 parts of adipic acid are added to the polyester reaction mixture. After condensation for an additional 2 hours at a temperature of about 260° C. at a pressure of 0.5 mm. Hg, a polyester having carboxyl end groups is obtained which melts at a temperature between 190° to 208° C. and a molecular weight of about 1,600.

Approximately 50 parts of this polyester are dissolved in about 70 parts of trichlorobenzene at about 200° C. About 5.25 parts of hexane diisocyanate dissolved in about 20 parts of trichlorobenzene are added dropwise to this solution over a period of about 10 minutes and the reaction solution is maintained at a temperature of about 200° C. for an additional 3 hours until the evolution of carbon dioxide has ceased. On cooling, the trichlorobenzene solution solidifies to a solid gel from which trichlorobenzene is removed by steam distillation after grinding. The polycondensate melts at a temperature of between about 190° to 200° C. and has a K-value of about 60.8.

EXAMPLE 8

About 500 parts of a polyester of terephthalic acid, adipic acid and ethylene glycol having a melting point of between about 210° to 215° C. (molecular weight 3,000) prepared in accordance with the polyester described in Example 1 are dissolved in about 850 parts of methylbenzoate at about 195° C. A solution of about 28.0 parts of hexanediisocyanate in about 250 parts of methylbenzoate is added dropwise to this polymer solution at a temperature of about 195° to about 200° C. for a period of about 10 minutes. After the addition of the diisocyanate solution has been completed, the reaction solution is kept at a temperature between about 190° to about 195° C. for an additional 20 minutes. The methyl benzoate solution of the polyester urethane is poured into vats. The solid gel which formed on cooling, is ground in a mill and the solvent removed from the granulate by steam distillation. The polycondensate melts at a temperature between about 200° and about 205° C., and has a K-value of about 57.2.

If acetophenone is substituted for methyl benzoate as solvent and the reaction is carried out in a similar manner, a polyester urethan having a K-value of about 53.0 is obtained.

EXAMPLE 9

(a) Manufacture of the Polyester 5,122 g. of dimethyl terephthalate, 2,350 g. of ethylene glycol and 158 g. of 1,4-butane diol are polyesterified with 1.5 g. of lead oxide and 0.8 g. of antimony oxide for 20 hours while stirring in a nitrogen atmosphere and with a continuous increase of the temperature up to 230° C. Splitting off methanol starts at about 160° C. The methanol is distilled off with a column. When 1,650 g. of methanol are distilled off, the excess glycol is distilled off for 45 minutes at 235–240° C. C./12 Torr and then for 60 minutes at 240–250° C./0.5 Torr. The polyester thus obtained has a molecular weight of 3,500 and melts at 248 to 253° C.

(b) Preparation of the Polyester Amide 3,000 g. of the polyester are dissolved in 4,900 g. of trichloro benzene in a 10 l. autoclave as described in Example 1. 195.5 g. of melted glutaric acid anhydride are poured into the 210° C. solution. Then 100 g. of hot trichloro benzene are added. The reaction mixture is held for 60 minutes at 210 to 215° C. while stirring. A solution of 173.0 g. of hexamethylene diisocyanate in 200 g. of trichloro benzene is added within 30 minutes 100 g. of trichloro benzene are added. After reaction for three hours at 215° C. (while carbon dioxide is split off) the trichloro benzene is removed with a steady decrease of pressure down to 1 to 2 Torr, while simultaneously increasing the temperature within the autoclave to 235 to 240° C. The melt of the polyester amide is expelled through the bottom valve with nitrogen at a pressure of 3 to 4 atmospheres. After cooling the polyester amide is granulated.

Melting point _____ °C__ 235
K-value _____ 55.0

(c) Production of the Foil

Before extrusion the granulate is dried for three hours at 110° C./0.1 Torr and then extruded through a broad sheeting die of 160 mm. width by means of a two-step degassing screw at 235° C. The foil is chilled by passing over a roller at a temperature of 77° C. in a water bath. The amorphous foil is then stretched two-dimensionally in a ratio of $(1:4.3)^2$ and then fixed by heating it at 180° C. for five minutes under the stretching tension. The foil shows remarkable crystallinity in the X-ray diagram. E-modulus in all directions is 550 kg./mm.$^2$.

EXAMPLE 10

(a) Preparation of the polyester 1,940 g. of dimethyl terephthalate, 1,040 g. of ethylene glycol and 63 g. of 1,4-butane diol are polyesterified with 0.9 g. of lead oxide while stirring in a nitrogen atmosphere and with 0.3 g. of antimony oxide. Polyesterification is performed for 15 hours with steady increase of temperature up to 230° C. Splitting off methanol starts at about 150° C. Methanol is distilled off through a column filled with glass particles. When about 630 g. of methanol have been distilled off heating is continued for further four hours with an increase of temperature to 230 to 250° C. Then the excess glycol is distilled off without a column within 60 minutes at 250° C./12 Torr and finally for 120 minutes at 250° C./0.5 Torr. Finally 202 g. of phthalic acid anhydride are added to the melt. Reaction is continued for 20 minutes at 240° C./760 Torr and for 20 minutes at 240° C./0.5 Torr. A polyester with carboxyl-terminated groups is obtained having a molecular weight of 2000 (titration in cyclohexane with sodium). Melting point 225–230° C.

(b) Preparation of the polyester amide 500 g. of the polyester are dissolved in 700 g. of trichloro benzene at 215° C. 42 g. of hexamethylene diisocyanate-1,6 are dropped into the solution within 15 minutes while stirring. The hexamethylene diisocyanate is dissolved in 250 g. of trichloro benzene. 100 g. of trichloro benzene are finally added. The reaction mixture is heated for 3.5 hours to 215° C. to split off carbon dioxide. The viscous solution is poured into a tank where it solidifies to a dry gel which is chopped with acetone in a mixer. The residual acetone which already contains a part of the trichloro benzene is decanted. The grained polymer is extracted three times for ten minutes each. The polymer is removed by vacuum filtration and dried in vacuo at 110° C. Melting point of the powdery polyester amide is 225 to 228° C. The K-value is 68.8.

(c) Manufacture of the foil

The foil is made as in Example 9 which is then stretched two-dimensionally and then fixed. The stretched foil shows a remarkable crystallinity in the X-ray diagram. The E-modulus in all directions is 520 kg./mm.$^2$.

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

What is claimed is:

1. A process for preparing a foil having a high E-modulus which comprises reacting an organic polyisocyanate with high molecular weight polyesters which melt at about 180° C. in the presence of an inert organic solvent having a boiling point of between about 150° C. and about 330° C., removing the solvent, extruding the solvent free reaction product to form a foil, biaxially stretching the foil and thereafter fixing said foil in the presence of heat, said polyesters obtained from the reaction of dicarboxylic acids containing at least 70 mol percent of an aromatic dicarboxylic acid and dihydric alcohols containing at least 70 mol percent of ethylene glycol.

2. The process of claim 1 wherein a nonaromatic dicarboxylic acid is present in an amount up to 30 mol percent.

3. The process of claim 1 wherein the polyisocyanate is a diisocyanate.

4. The process of claim 1 wherein the extruded reaction product is cooled to a temperature between about 30° C. and 80° C.

5. The process of claim 1 wherein the polyester has a molecular weight between about 800 and 5,000.

6. The process of claim 1 wherein the biaxial stretching is carried out simultaneously in a longitudinal and transverse direction at a temperature between about 30° C. and 80° C.

7. The process of claim 1 wherein the foil is stretched in a longitudinal and transverse direction in a ratio of from 1:1.5 to about 1:6.

8. The process of claim 1 wherein the polyesters are terminated with carboxyl groups.

9. The process of claim 1 wherein the inert organic solvent is an aromatic solvent having a boiling range between about 150° C. and 330° C.

10. The process of claim 1 wherein the polyesters melt at a temperature between about 180 C. and 260° C.

11. The process of claim 1 wherein the inert organic solvent has a boiling point of between 150° C. and 330° C. and is selected from the group consisting of halogenated aromatic hydrocarbons, nitrated aromatic hydrocarbons and mixtures thereof.

12. The process of claim 11 where the polyisocyanate is reacted with the polyester at a temperature from about 130° C. to about 230° C.

13. A process for preparing a foil having a high E-modulus which comprises reacting an organic polyisocyanate with high molecular weight carboxyl terminated polyesters which melt above about 180° C. in the presence of an inert organic solvent having a boiling point of between about 150° C. and about 330° C., removing the solvent, extruding the solvent free reaction product to form a foil, biaxially stretching the foil and thereafter fixing said foil in the presence of heat, said polyesters obtained from the reaction of dicarboxylic acids containing at least 70 mol percent of an aromatic dicarboxylic acid and dihydric alcohols containing at least 70 mol percent of ethylene glycol in an amount to form hydroxyl terminated polyesters and thereafter reacting said polyesters with dicarboxylic acid anhydrides to convert said hydroxyl terminated polyesters to carboxyl terminated polyesters.

References Cited

FOREIGN PATENTS 922,255    1/1955    Germany.
712,637    6/1965    Canada.

ROBERT F. WHITE, *Primary Examiner.*

R. B. MOFFITT, *Examiner.*

G. AUVILLE, *Assistant Examiner.*